Sept. 29, 1942.    F. BIELITZ ET AL    2,297,386
MOUNTING FOR CONTROL DEVICES
Filed Oct. 31, 1939

FRIEDRICK BIELITZ,
AUGUST LICHTE,
Inventors

BY  *Bailey & Crarens*
ATTORNEYS

Patented Sept. 29, 1942

2,297,386

UNITED STATES PATENT OFFICE 2,297,386

MOUNTING FOR CONTROL DEVICES

Friedrich Bielitz, Dessau, and August Lichte, Dessau-Alten, Germany; vested in the Alien Property Custodian Application October 31, 1939, Serial No. 302,254
In Germany November 2, 1938

4 Claims. (Cl. 137—156)

This invention is directed to a vibration and shock absorbing mechanism for a control device responsive to changes in pressure or temperature. The invention more particularly relates to the mounting of a control device used for regulating the engine of an aircraft.

Control devices for aircraft engines are rather delicate instruments which are sensitive to changes in pressure, or temperature, as the case may be. Generally the devices consist of a bellows which expands or contracts with the physical changes in the surrounding atmosphere, the movements of the bellows being transmitted to a regulating apparatus. It has been customary to mount the bellows within its protective housing upon ball and socket joints so that movement of the bellows is accurately transmitted to the regulating apparatus.

Difficulty is experienced with this mounting when used at places subjected to vibration, as in an aircraft. The ball and socket joint itself unavoidably permits play between the elements thereof, and the vibrations tend to disrupt the mounting and accordingly affect the adjustment of the device. Severe vibrations can even damage the device. In any event, frequent testing of the device is necessary in order that it may function in proper adjustment.

An object of this invention is to mount a control device, such as a bellows, so that it will not be affected by vibrations transmitted thereto.

Another object of the invention is to support resiliently the ball and socket joint of a control device mounting in order that harmful vibrations are effectively damped or absorbed.

Another object of the invention is to provide a resiliently supported ball and socket mounting for the bellows of a control device so that the axis of the bellows is kept properly aligned in spite of vibrations, and movements of said bellows are accurately transmitted to a regulating apparatus.

Generally, these and other objects of the invention are obtained by resiliently pressing one element of the ball and socket joint against the other. By so doing, vibrations tending to displace these elements are absorbed or damped, while at the same time the elements are maintained in adjustment and no vibration can reach the bellows and damage it.

The means by which the objects of this invention are accomplished are more fully described with respect to the accompanying drawing, in which.

Figure 1:
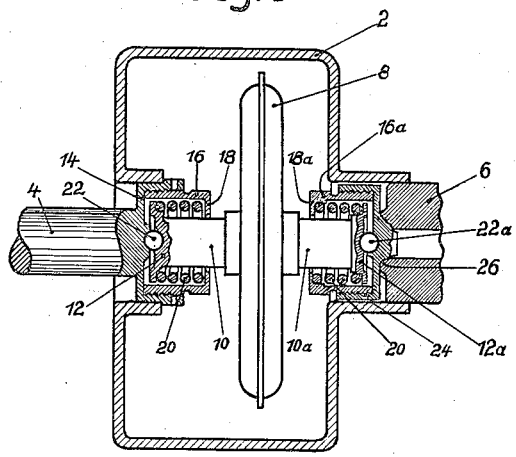
Fig. 1 is a side sectional view of one form of the invention.

In Fig. 1, the protective housing 2 is fixed to shaft 4 and slidably mounted upon shaft 6. Either shaft 4 or shaft 6 may constitute the means for transmitting movements of the bellows 8 within housing 2, to a regulating apparatus, although for purposes of this description it will be assumed that shaft 4 is immovably secured to a portion of an aircraft.

Bellows 8 includes oppositely directed and axially spaced spindles 10 and 10a, respectively, which are in turn coaxial with shafts 4 and 6. Plates 12 and 12a of greater diameter than shafts 10 and 10a are attached to each end of the spindles.

Shaft 4 is provided with a bell flange 14 into which a cylindrical retaining element 16, having an inwardly turned flange 18 at one end, is threaded. A coil spring 20 is interposed between flange 18 and plate 12. As shown in Fig. 1, an annular inwardly directed flange on one end of housing 2 is fixedly mounted upon flange 14.

A ball 22 is seated in sockets on the end of shaft 4 and in plate 12, thus forming a ball and socket joint between shaft 4 and spindle 10. Spring 20 resiliently presses plate 12 against ball 22, and acts to absorb or damp vibrations transmitted to the joint through housing 2 or shaft 4.

Spindle 10a has a plate 12a similar to plate 12, secured thereto. A cap 24 encloses the end of spindle 10a and provides a socket to seat ball 22a between cap 24 and plate 12a in which there is a like socket. Cap 24 is maintained in axial alignment with shaft 6 by means of a shoulder 26 fitted into a recess in the end of shaft 6.

A spring retaining cylinder 16a is threaded into cap 24 to hold between its flange 18a and plate 12a, a spring 20a. Consequently the bellows 8 in expanding or contracting moves shaft 10a which in turn causes movement of the shaft 6 through the ball and socket joint composed of elements 12a, 22a, and 24. By reason of the ball and socket joints, the spindles 10 and 10a are maintained in alignment without being subject to strain on shafts 4 and 6. The advantages of such are retained, while the effects of vibrations which would disrupt the elements of the joints, and perhaps damage the bellows 8, are substantially absorbed, damped or eliminated by the spring 20 and 22a.

Figure 2:
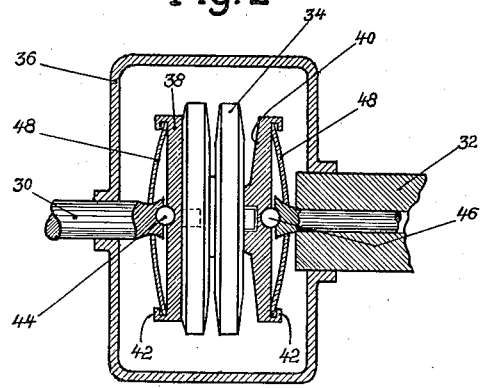
Fig. 2 is a similar view of a modified form of the invention.

A modified form of the invention which is productive of the same advantages and results is shown in Fig. 2, wherein shaft 30 is assumed to be immovable and shaft 32 movable, the bellows 34 being enclosed by a protective housing 36.

The opposite ends of bellows 34 are provided with plates 38 and 40, each of which has inwardly flanged peripheries 42, and a central socket adapted to seat a ball. Sockets are similarly provided on the respective ends of shafts 30 and 32, and balls 44 and 46 are seated between the ends of the shafts and their respective plates to form ball and socket joints.

Either leaf or disc springs 48 are fitted in shoulders formed on the ends of the shafts and the flanges 42. These springs function to absorb or damp vibrations in their passage from the shafts through the ball and socket joints to the bellows for the same results and advantages as described for Fig. 1.

In both Figs. 1 and 2 the springs hold the ball and socket elements together, and do not exert any force upon the bellows. Consequently, as the bellows is supported between two ball and socket joints, the applied pressures of the respective springs are directed away from the bellows and into the respective ball and socket joints, and the sensitivity of the bellows is unaffected by the springs, while the bellows is free from the effects of vibrations and misalignment of the supporting shafts.

Having now described a means by which the objects of this invention may be obtained, what we claim as new and desire to secure by Letters Patent is:

1. A regulating device comprising a fixed shaft, a movable shaft coaxial and linearly aligned with said fixed shaft, a bellows intermediate the shafts, socket plates joined to opposite sides of said bellows, balls between said plates and the ends of their respectively adjacent shafts, and spring means interconnecting said plates and shafts for resiliently urging them together.

2. A regulating device as in claim 1 further comprising a housing enclosing said bellows, said housing being fixedly mounted upon one of said shafts and slidably mounted upon the other of said shafts.

3. A regulating device for aircraft engines comprising a bellows, supporting means on opposite sides of said bellows, one of said supporting means being movable by said bellows, ball and socket joints between each supporting means, respectively, and said bellows, and each ball and socket joint including spring means for urging the ball and socket in each joint together.

4. A regulating device as in claim 3, said spring means comprising a first flange on each socket element, a second flange spaced from said first flange on each ball element, and a coil spring interposed between each pair of spaced flanges.

FRIEDRICH BIELITZ.
AUGUST LICHTE.